US008760417B2

(12) United States Patent
Haug (10) Patent No.: US 8,760,417 B2
(45) Date of Patent: Jun. 24, 2014

(54) TOUCH-ENABLED CIRCLE CONTROL FOR TIME AND DATE ENTRY

(75) Inventor: Tobias Haug, Reilingen (DE)

(73) Assignee: SAP AG, Walldorf (DE)

( * ) Notice: Subject to any disclaimer, the term of this patent is extended or adjusted under 35 U.S.C. 154(b) by 743 days.

(21) Appl. No.: 12/905,536

(22) Filed: Oct. 15, 2010

(65) Prior Publication Data

US 2012/0092267 A1 Apr. 19, 2012

(51) Int. Cl.
*G06F 3/041* (2006.01)

(52) U.S. Cl.
USPC .................... 345/173; 715/780; 715/810

(58) Field of Classification Search
USPC .................................. 345/173–179
See application file for complete search history.

(56) References Cited

U.S. PATENT DOCUMENTS

| 2003/0210286 | A1* | 11/2003 | Gerpheide et al. ............ 345/863 |
| 2005/0057524 | A1* | 3/2005 | Hill et al. ...................... 345/173 |
| 2008/0062141 | A1 | 3/2008 | Chandhri |
| 2008/0122863 | A1 | 5/2008 | Yoshihara et al. |
| 2008/0309626 | A1 | 12/2008 | Westerman et al. |

FOREIGN PATENT DOCUMENTS

| EP | 0511929 A1 | 11/1992 |
| EP | 0860765 A1 | 8/1998 |
| EP | 2144385 A2 | 1/2010 |
| JP | 5209974 A | 8/1993 |
| JP | 8095695 A | 4/1996 |
| JP | 2002162486 A | 6/2002 |
| JP | 2005190203 A | 7/2005 |
| WO | WO-03073411 A1 | 9/2003 |
| WO | WO-2006020304 A2 | 2/2006 |
| WO | WO-2007030503 A2 | 3/2007 |
| WO | WO-2008008579 A2 | 1/2008 |
| WO | WO-2008085790 A2 | 7/2008 |

OTHER PUBLICATIONS

Bragdon, Andrew, et al., "GestureBar: Inproving the Approachability of Gesture-Based Interfaces", *Proceedings CHI*, (2009),2269-2278.
Dhawale, Pushkar, et al., "Bare-Hand 3d Gesture Input to Interactive System", ACM 1-59593-473-1, (2006),25-32.
Harrison, Chris, et al., "Scratch Input: Creatomg Large, Inexpensive, Unpowered and Mobile Finger Input Surfaces", *UIST'08*, (2008),205-208.
Hinkley, Ken, et al., "InkSeine: In Situ Search for Active Note Taking", *Proceedings of CHI*, (2007),251-260.

(Continued)

*Primary Examiner* — Alexander Eisen
*Assistant Examiner* — Cory Almeida
(74) *Attorney, Agent, or Firm* — Schwegman, Lundberg & Woessner, P.A.

(57) ABSTRACT

In a system and a method, a selection of an input data field is detected. In response to the selection of the input data field, a user interface having an inner concentric circle and an outer concentric circle is generated. A contact point corresponding to a location of a touch gesture submitted via a touch-enabled input device within one of the inner concentric circle and the outer concentric circle is detected. An angular velocity of circular movement from the contact point around one of the concentric circles is measured. An input data value is adjusted at a granularity based on the contact point and at a rate based on the measured angular velocity of circular movement.

19 Claims, 8 Drawing Sheets

(56) References Cited

OTHER PUBLICATIONS

Jacob, Robert J., "Human-Computer Interaction: Input Devices", *CRC Press. ACM Computer Surveys* vol. 29, No. 1, (Mar. 1998),3 pgs.

Kakehi, Yasuaki, et al., "Tablescape Plus: Upstanding Tiny Displays on Tabletop Displays", *ACM SIGGRAPH Emerging technologies*, (Article No.31),(2006),1 pg.

Lumsden, Joanna, et al., "A Paradigm Shift: Alternative Interaction Techniques for Use with Mobile & Wearable Devices", *Proc. of the 14th Annual IBM Centers for Advanced Studies Conference*, (2003),14 pgs.

Myers, Brad A., "A Brief History of Human-Computer Interaction Technology", *Internactions* (Mar. & Apr.), (1998),11 pgs.

Poirier, Franck, "Dimensions Carcteristiques de l'interaction gestuelle sur table de collaboration", *IHM*, (2007),59-62.

Wilkinson, Brett, et al., "Investigating Touch Interactions for an Augmented World", *OZCHI Proceedings*, (2008),25-32.

"European Application Serial No. 11006353.4, Extended European Search Report mailed Nov. 24, 2011", 8 pgs.

\* cited by examiner

TOUCH-ENABLED CIRCLE CONTROL FOR TIME AND DATE ENTRY

TECHNICAL FIELD

This application relates generally a data entry mechanism, and specifically, to a system and method for inputting data using a concentric circular user interface and touch gestures.

BACKGROUND INFORMATION

In applications, entry of time and date information is a common task and can occur multiple times in any given task or transaction. Time information is commonly entered by either typing a time into an input field (e.g., freestyle entry of a specific time) or selecting a time from a drop-down listbox (e.g., conditional or limited selection). Date information is typically entered by either typing a date into an input field (e.g., freestyle entry of a specific date) or by selecting a date from a "calendar pop-up" representing a standard monthly view.

While such date and time entry implementations are commonplace, they require a number of actuations and user movements of one or more input devices. These actuations and user movements may not be ergonomic and may be time-consuming depending on the type of input device (e.g., mouse, keyboard, touch-enabled screen) and the screen size of the device.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Various embodiments include at least one of a system, a method, and a tangible computer-readable medium with executable instructions stored thereon providing at least one user interface allowing a user to input data efficiently into an input field.

Some such embodiments enable a user to select an input data value for an input data field using touch gestures entered via a generated touch-enabled user interface. A processor-implemented user interface generator module may generate a touch-enabled user interface upon the selection of a data input field. The touch-enabled user interface may include concentric circular user interfaces. A processor-implemented movement detection module may detect a user input contact point within one of the concentric circular user interfaces and measure an angular velocity of movement from the user input contact point around the concentric circular user interfaces. A processor-implemented data input module may adjust an input data value for the data input field at a granularity based on the user input contact point and at a rate based on the angular velocity of movement within the concentric circular user interfaces. The input data value may be displayed as the value is adjusted.

Figure 1:
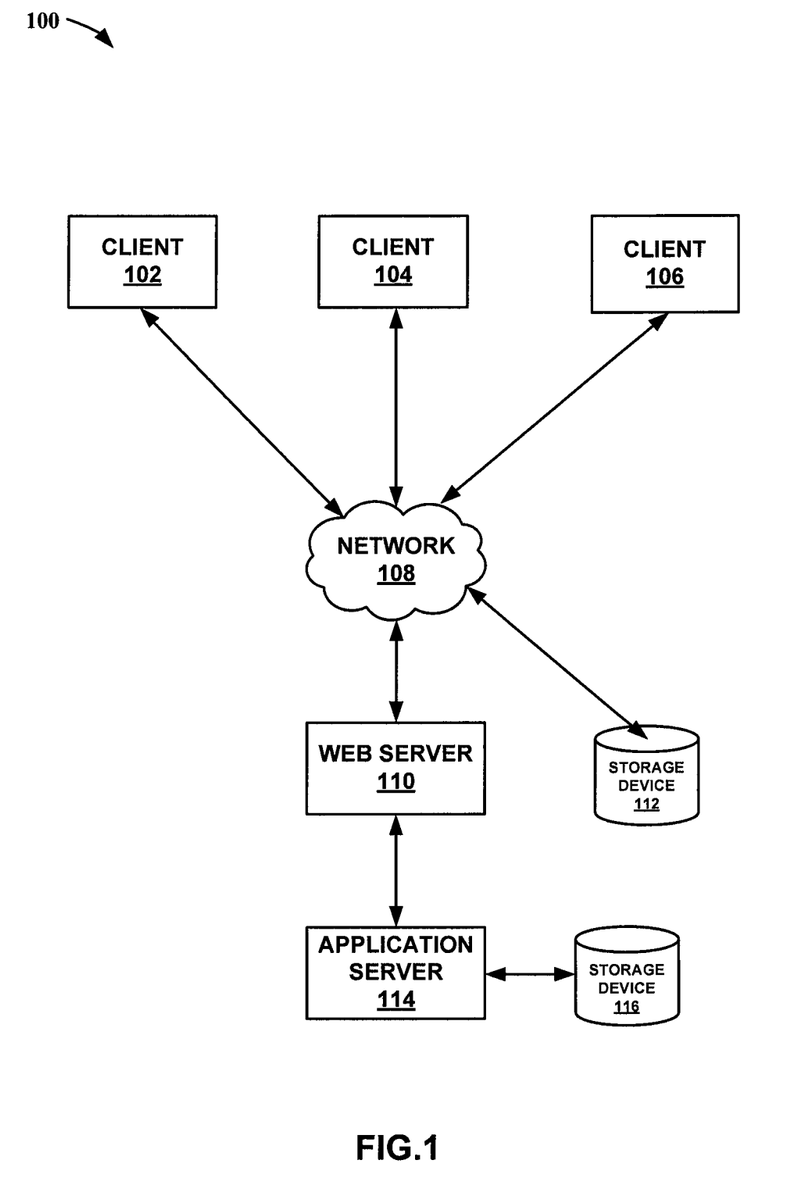
FIG. 1 is a block diagram illustrating an example embodiment of a networked environment within which a client device connects, via a network, with an application server.

FIG. 1 is a block diagram illustrating an example embodiment of a networked environment 100 within which a client device connects, via a network, with an application server. Referring to FIG. 1, client devices 102, 104, 106 may connect via a network 108, such as the Internet, to an application server 114 via web server 110. Client devices 102, 104, 106 may be a mobile or handheld device, a personal computer (PC), a tablet PC, a terminal device, a Personal Digital Assistant (PDA), or a cellular telephone, among other things. In an example embodiment, client devices 102, 104, 106 may include touch-enabled input devices, such as touch screens or touch pads. Client devices 102, 104, 106 may execute one or more standalone applications or Internet-enabled applications delivered via the network by the web server 110. In an example embodiment, the applications may be business software applications. The applications may permit entry of data via the touch-enabled input devices.

Data entered or retrieved for use with the applications may be stored and accessed from storage associated with the client devices 102, 104, 106 (e.g., a local hard drive, memory, data storage device) or from a network-attached storage device 112, 116 (e.g., database, disk array). Application server 114 may store and deliver applications (e.g., business applications, Internet-enabled applications) to clients 102, 104, 106 via web server 110 and network 108. In an example embodiment, a client terminal device may execute applications residing on application server 114 via the network 108. In an example embodiment, application server 114 may store the applications and data related to the applications in an attached storage device 116.

Figure 2:
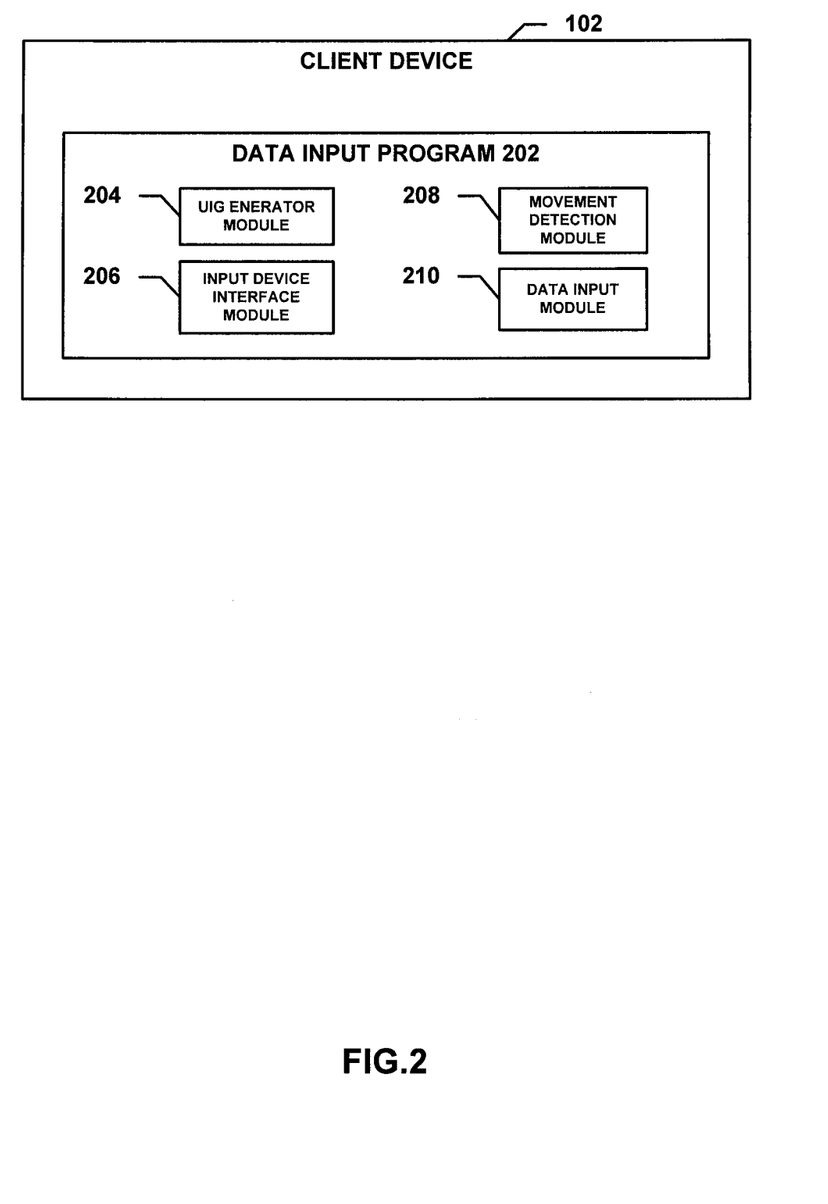
FIG. 2 is a block diagram of a computing device, in accordance with an example embodiment.

FIG. 2 is a block diagram of a computing device, in accordance with an example embodiment. Computing device may be any of client devices 102, 104, 106 of FIG. 1. For purposes of illustration only, discussion of FIG. 2 occurs with reference to client device 102. Client device 102 may include a data input program or application 202. Data input program 202 may include a user interface ("UI") generator module 204, an input device interface module 206, a movement detection module 208, and a data input module 210.

The UI generator module 204 may generate a user interface for display to a user. The user interface may be generated when a user interacts with an application, such as a business software application, to enter data. In response to an indication that the user is attempting to enter data, the UI generator module 204 may generate a UI to enable the user to enter data. In an example embodiment, the client device includes a touch-enabled input mechanism, such as a touch screen or a touch pad. The UI generated by the UI generator module 204 may be a touch-enabled UI that enables a user to enter data through recognized touch gestures.

In an example embodiment, the UI generated by the UI generator module may be a circular UI that enables a user to scroll through data options using a recognized touch gesture. The circular UI may include concentric circles for inputting data. In an example embodiment, the circular UI may overlay an input field in which the user seeks to enter data. In other example embodiments, the circular UI may be located away from the input field. The concentric circles of the circular UI may represent varying degrees of data selection granularity. For example, an inner circle of the UI may offer a user coarser control over the scrolling or selection of input data values, while an outer circle of the UI may offer a user finer control over the scrolling or selection of the input data values. The circular UI is designed to be ergonomically efficient such that the need for multiple finger or hand movements and clicks or taps is minimized. For example, if the user initially touches an inner circle of the UI to adjust input data values coarsely (i.e., with a larger granularity), the user need only to slide his finger over to the outer circle when finer control over input data value selection is desired. The user thus needs one initial tap or touch of the input mechanism to manipulate and select an input data value.

The input device interface module 206 may interface with a touch-enabled input mechanism of the client device. Every device may include device drivers that enable software applications to interface with hardware devices. In an example embodiment of a mobile device having a touch screen, the mobile device may include a device driver to recognize and translate user input gestures into commands or signals capable of being used by applications. The input device interface module 206 may interface with the touch screen device driver of the mobile device to receive user touch screen gestures.

The movement detection module 208 may interface with the input device interface module 206 to receive and translate user touch screen gestures into user movement values. The user movement values may indicate, among other things, a starting point or location of a user's pointing device (e.g., a finger, a stylus or other pointing object) within the user interface generated by UI generator module 204, a location of a user's pointing device on the touch screen at various moments after initial contact, and an amount of pressure applied to the touch screen. For example, the movement detection module 208 may receive a location of the user's pointing device on the touch screen from the input device interface 206. The movement detection module 208 may receive the coordinates of the center point or axis of the generated UI from the UI generator module 204, and using the center point of the generated UI, the movement detection module 208 may determine a radius or distance between the axis and the pointing device location. The movement detection module 208 also may receive additional location points of the user pointing device from the input device interface module 206. In an example embodiment, the input device interface module 206 may sample the location of the user pointing device at a predetermined sampling interval. Using the additional location points, the movement detection module 208 may determine a direction and speed of movement of the user pointing device. In an example embodiment, this determination may be aided by an accelerometer or other motion-sensing device included in a client device. In an example embodiment, the movement detection module 208 further may translate pressure applied to the touch screen into a movement value.

In addition to determining user movement values, the movement detection module 208 further may calculate a velocity of movement of a user's pointing device, either angularly or linearly. Calculation of the velocity of the user's pointing device may entail determining an angle φ formed by the angle from the x-axis (e.g., the origin) of the circular UI to the location of a contact point within the generated UI. Angular velocity may be expressed as:

$$\omega = d\phi/dt$$

In this equation, φ is the angle determined with reference to the x-axis and the contact point of the user pointing device, and dφ/dt is the rate of change of the angular position of the contact point. By measuring the angle φ of the contact point with respect to the x-axis over successive contact point measurements in time, the movement detection module 208 may determine a rate of change of the angle φ over a period of time, and hence, the angular velocity of the user's pointing device.

The data input module 210 may receive user movement values from the movement detection module 208 and may translate the user movement values into a corresponding input gestures or a data value to be displayed via the user interface. For example, as a user moves a pointing device across the UI generated by the UI generator module 204, the UI may display a changing data value reflecting movement of the pointing device across the touch screen. In an example embodiment, when the user first selects an input field for data entry and the circular UI is generated by the UI generator module 204, the circular UI may display an initial data value. As the user moves a pointing device (e.g., a finger, a stylus), the displayed data value may scroll in an increasing or decreasing fashion. The data input module 210 may adjust the rate at which the data value changes based on both the location of the pointing device relative to the generated UI and the angular velocity of the pointing device. In an example embodiment, if the user contacts the generated UI in an inner circle and begins to move the pointing device in a circular motion, the data input module 210 may change a displayed data value at a rate commensurate with the velocity of movement. The data value may increment or decrement (depending on the direction of the user's movement) at a larger granularity because the user contacted the inner circle of the generated UI. In another example embodiment, if the user contacts the generated UI in the outer circle and begins to move the pointing device in a circular motion, the data input module 210 may change the displayed data value at a rate commensurate with the velocity of movement and at a smaller granularity to reflect the outer circle's status as a data input mechanism offering finer control over data input values.

In an example embodiment, the data input module 210 may translate certain user input movements into recognized touch gestures capable of manipulating the generated UI, as opposed to gestures for manipulating an input data value for an input data field. For example, a recognized touch gesture may enlarge or zoom out on the generated UI, in the event the generated UI is too small for practical utility. Another touch gesture may zoom in or decrease the size of the generated UI if the generated UI is too large for the display screen.

Figure 3:
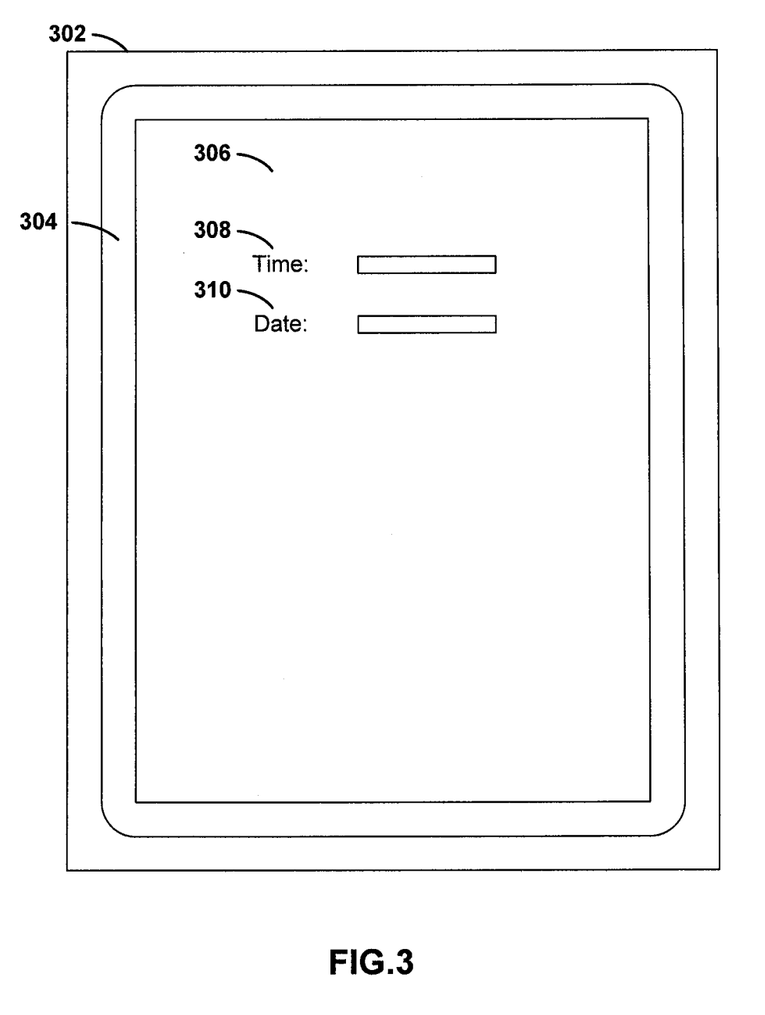
FIG. 3 is a block diagram of a device capable of displaying a user interface, in accordance with an example embodiment.

FIG. 3 is a block diagram of a device capable of displaying a user interface, in accordance with an example embodiment. Referring to FIG. 3, a device 302 capable of displaying a user interface is displayed. In example embodiments, device 302 may be a computing device, such as a handheld device or a mobile device, or may be a display device connected to a computing device, although other devices capable of displaying a user interface are contemplated. Device 302 may include a display area 304. Display area 304 may vary in size depending on the size of the device 302. In an example embodiment, display area 304 may be a touch screen, such that display area 304 may be responsive to user touch gestures. Display area 304 may display user interfaces delivered via a network and associated with a network-enabled application or user interfaces associated with applications executing on device 302. Display area 304 may display a user interface 306. User interface 306 may be an application window and all display components contained therein or an interface generated within a display window. User interface 306 may receive and display information generated from an application or delivered via a network. User interface 306 further may include one or more data fields, some of which may be input data fields that permit a user to enter information.

In an example embodiment, data fields 308 and 310 are shown in the user interface 306 of FIG. 3. In an example embodiment, data field 308 may be an input data field for entering time information. Data field 310 may be an input data field for entering date information. In example embodiments, data fields 308, 310 may permit a user to enter information manually, such as by typing data into the field. In other example embodiments, a user interface may be generated when a user indicates that he wishes to enter data into data fields 308, 310, such as, for example, by clicking or tapping on the data field with a user input device, such as a touch-enabled input device.

Figure 4:
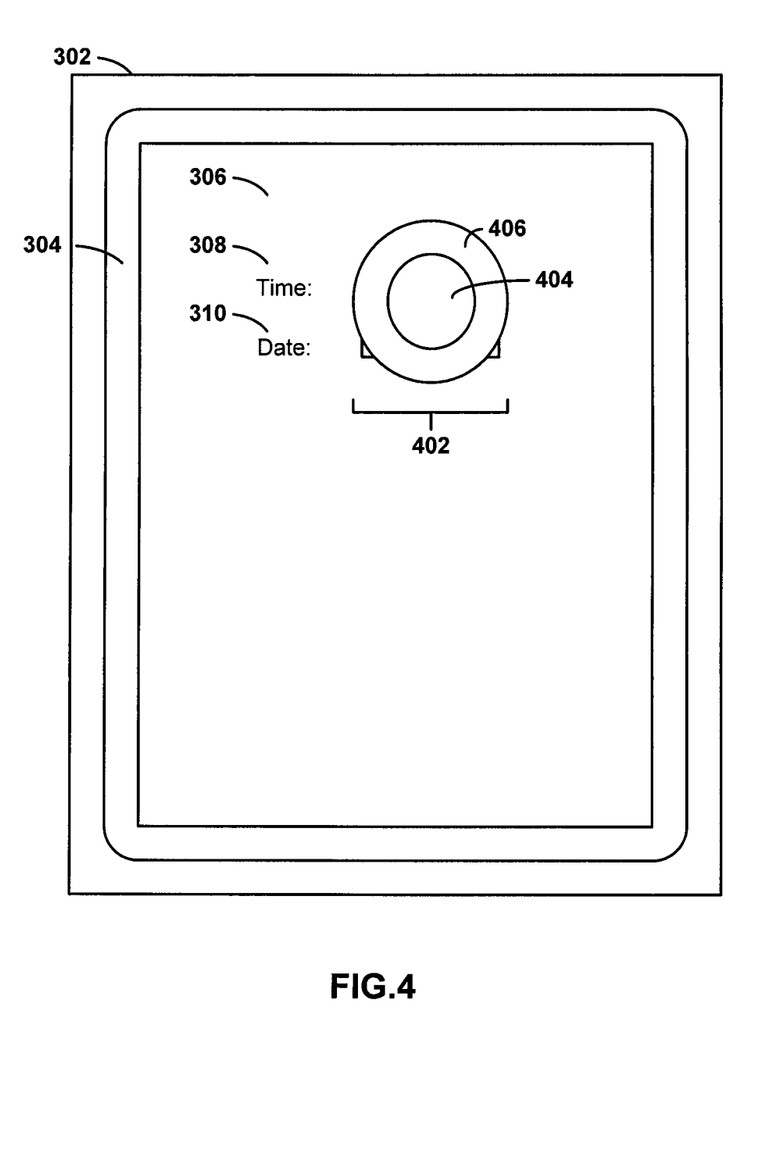
FIG. 4 is a block diagram of a device capable of displaying a user interface, in accordance with an example embodiment.

FIG. 4 is a block diagram of a device capable of displaying a user interface, in accordance with an example embodiment. Referring to FIG. 4, the device 302 shown in FIG. 3 is illustrated. In an example embodiment in which data field 308 is selected for data entry, a circular user interface 402 is generated and displayed within user interface 306 and display area 304. Circular user interface 402 may include concentric circular user interfaces 404, 406. Circular user interfaces 404, 406 may be touch-sensitive user interfaces, such that data entered into data field 308 may be selected by touching user interfaces 404, 406. In the example embodiment of FIG. 4, circular user interface 402 is shown as overlaying data field 308. Because circular user interface 402 overlays data field 308, a display element (not shown) may display a current data value selected by the user interface 402 to the user. In other example embodiments, circular user interface 402 may not overlay data field 308 such that a current data value selected by the user interface 402 may be displayed in the data field 308.

To select a data value to be input into data field 308, a user selects either circular user interface 404 or circular user interface 406 with a user input device, such as a finger, a stylus, or a touch-enabled input device (e.g., touch screen, touch pad). To adjust data values, the user moves the user input device in a circular direction left or right. Based on the location of an indicator (e.g., an arrowhead icon, a finger icon) of the user input device within the circular user interface 402 and based on the speed of rotation (e.g., as measured by angular velocity), the data values may adjust with a corresponding speed and granularity. For example, if the speed at which the user moves the user input device within the circular user interface 402 is slow, the data value displayed to the user may slowly adjust. Conversely, moving the user input device within the circular user interface 402 quickly results in the data values adjusting quickly or scrolling at larger granularity.

In an example embodiment, having an indicator of the user input device located in inner circular UI 404 notifies the user interface that the user seeks to adjust data values using a larger granularity. For example, inner circular UI 404 may adjust a time value (e.g., hours) in six hour intervals. If the user places the user input device in outer concentric circular user interface 406, data values may increment or decrement at a smaller granularity. Using the foregoing example, rather than increment or decrement a time value in six hour intervals, a user selecting the outer concentric circular interface 406 may see the data value change in one hour intervals. When a user has finished adjusting a data value for a particular data field or component (e.g., an hour value, a minute value, a second value), the user may input a recognized command to select the displayed data value. For example, a touch-enabled device may recognize a tap or a pressure-sensitive depression on the touch screen as a command to select and "lock in" the displayed data value. Once a data value for a particular portion (e.g., hour, minute, second) of an input field has been selected, the user interface 402 may shift the data input screen to the next input data field portion (e.g., hours to minutes, minutes to seconds) for data entry.

Figure 5:
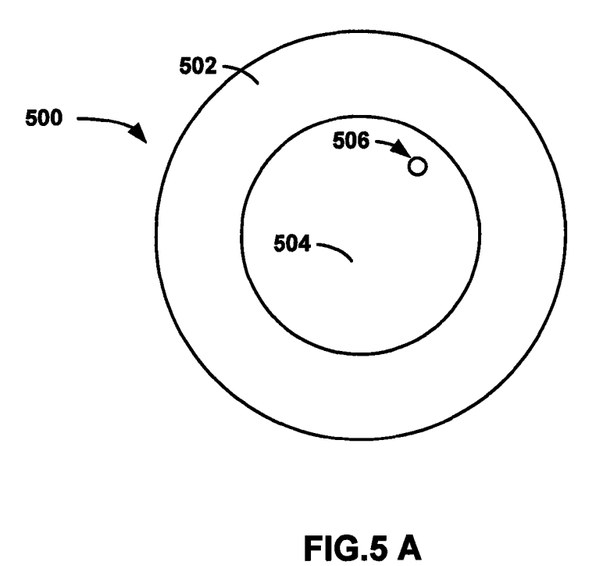
FIG. 5A illustrates a user interface, in accordance with an example embodiment.
FIG. 5B illustrates a user interface, in accordance with an example embodiment.

FIG. 5A illustrates a user interface, in accordance with an example embodiment. UI 500 may include concentric circular user interfaces 502, 504. UI 500 may be generated and displayed upon selection of a data field in which a user desires to input data. In an example embodiment, UI 500 is a touch-enabled UI, such that UI may recognize touch gestures entered via a user input device. Referring to FIG. 5A, a user may contact the user interface 500 within inner concentric circular user interface 504 at point 506. Inner concentric circular user interface 504 may offer a first user interface by which to adjust data values at a larger granularity. Outer concentric circular user interface 502 may offer a second user interface by which to adjust data values at a smaller granularity. User interface 500 may be designed such that a user is able to switch between user interface 502 and user interface 504 without lifting the user input device, thereby minimizing the number of actuations and movements required to select a data value for an input data field. Further, UI 500 may be designed to recognize the selection of a data value through a pressure-sensitive depression, thereby further minimizing the number of user input actuations and movements required.

FIG. 5B illustrates a user interface, in accordance with an example embodiment. Referring to FIG. 5B, user may contact user interface 500 within inner concentric circular user interface 504 at point 506. The movement detection module 208 may interface with input device interface module 206, both of FIG. 2, to determine the contact point 506 of the user input device relative to the generated user interface 500. Determination of the contact point 506 relative to the generated user interface 500 instructs the data input module 210 of FIG. 2 of the granularity or interval to use when adjusting the data value in response to movement by a user input device. The movement detection module 208 also determines an angle φ 510 between the a radius 508 of the contact point and the x-axis of the circular user interface 500. The movement detection module 208 and the input device interface 206 may sample different contact points over time, with an angle between each contact point and the x-axis being calculated. The movement detection module 208 uses these calculated angles 510 to determine an angular velocity of movement by the user input device. The rate at which the data value changes may be dependent on the angular velocity of the user input device movements. In an example embodiment, the granularity at which the data value increments or decrements may be dependent on the angular velocity of the user input device movements.

Figure 6:
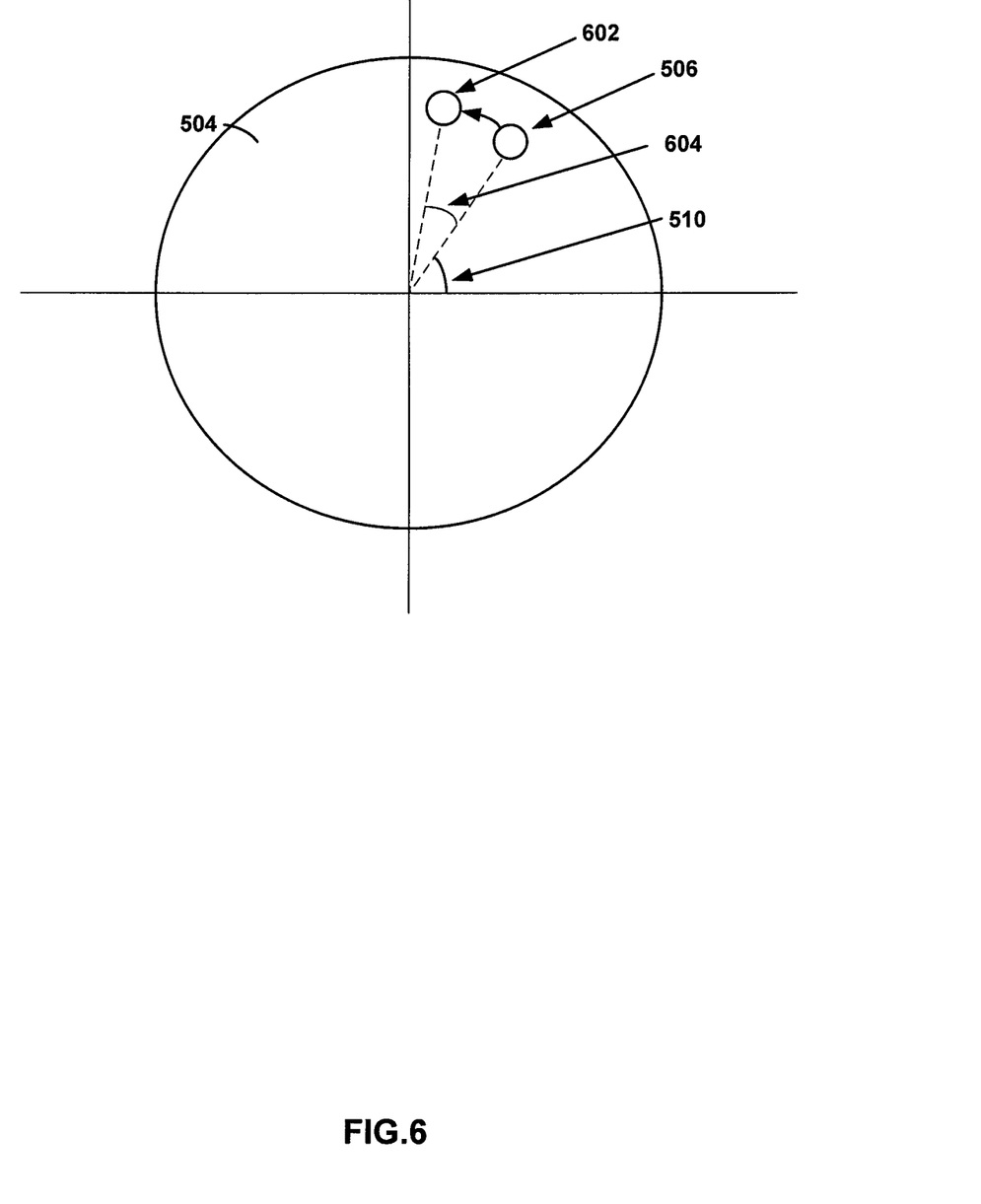
FIG. 6 illustrates a user interface, in accordance with an example embodiment.

FIG. 6 illustrates a user interface, in accordance with an example embodiment. Referring to FIG. 6, a user input device initially contacts a user interface 504 at contact point 506. The user input device may move the contact point from point 506 to point 602. For example, a user may touch the user interface

504 at point 506 with his finger and may move his finger counterclockwise from point 506 to point 602. The initial angle 510 between contact point 506 and the origin (e.g., x-axis) may be calculated. In an example embodiment, as contact point 506 is moved to contact point 602, the additional difference in angle 604 is calculated. Using the change in angle as the contact point changes over time, the movement detection module 208 of FIG. 2 may calculate an angular velocity of the user's finger. The angular velocity may inform the data input module 210 of FIG. 2 of the rate of change of a corresponding data value to be used as an input for a data field.

Figure 7:
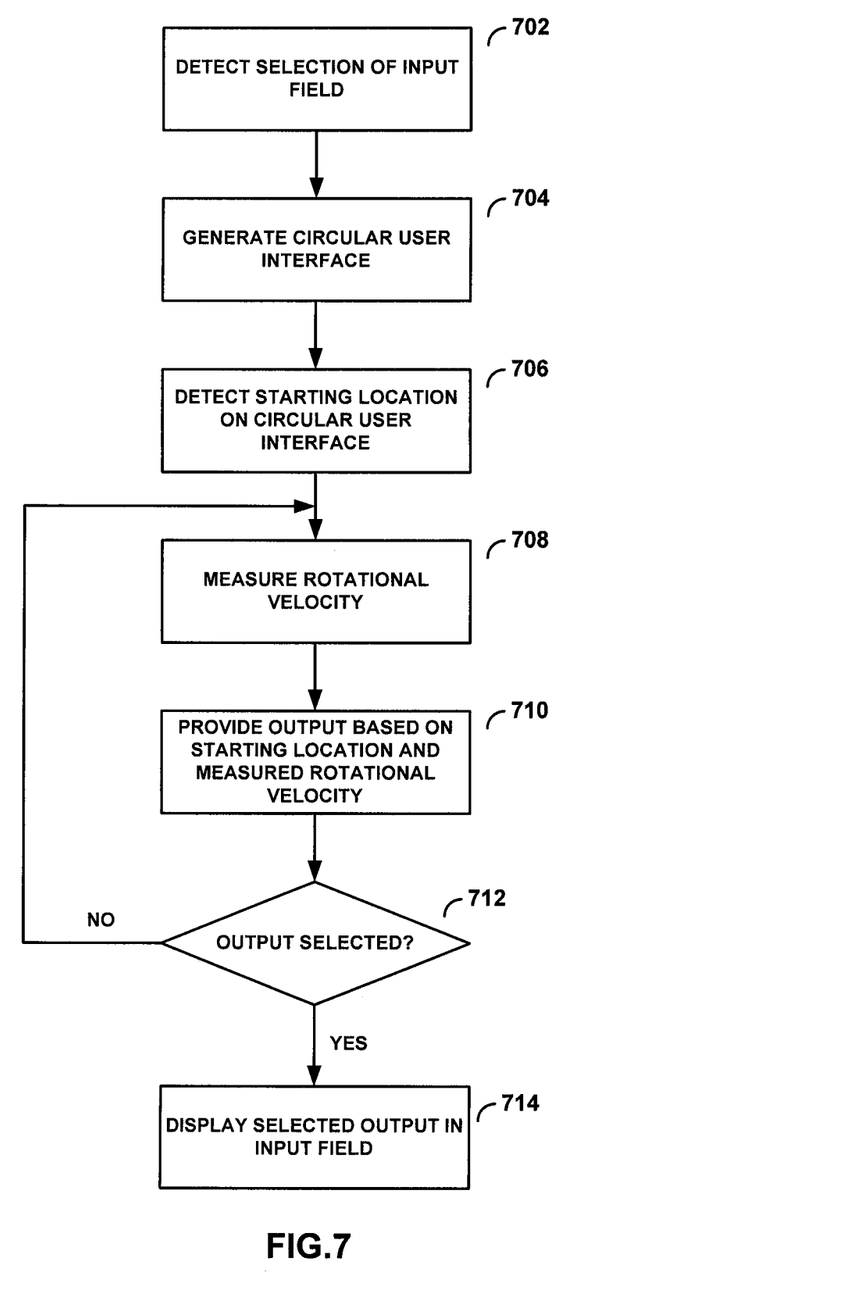
FIG. 7 is a flow diagram of an example method for inputting data, in accordance with an example embodiment.

FIG. 7 is a flow diagram of an example method for inputting data, in accordance with an example embodiment. At operation 702, a device or one of its components may detect the selection of an input field by a user. The user may select the input field using a touch gesture, such as tapping a touch screen with a finger or stylus.

In response to the selection of the input field, at operation 704, a user interface generation module 204 of FIG. 2 generates a user interface. The user interface may include concentric circular user interfaces. Concentric circular user interfaces may include an inner circular user interface and an outer circular user interface, where the two circular user interfaces share a common center point. Circular user interfaces may provide a user with an ergonomic mechanism by which to adjust or scroll through input data values for entry in an input data field. To adjust or scroll through input data values, a user may move a user input device indicator (e.g., a user's finger, a mouse cursor) in a circular motion around the circular user interfaces without the need for multiple user input actuations. Rather, an initial user actuation may be required to contact the generated UI, with adjustment of a corresponding input data value implemented using continuous user input device movements. Selection of an input data value may be achieved using a pressure-sensitive gesture. Thus, in the foregoing example embodiment, an input data value may be selected using one input device actuation.

Inner circular user interface offers a user coarser control over the adjusting or scrolling of an input data value, such that the interval or granularity of scrolling is large. In an example embodiment in which a user is entering a date into input data field, moving a user input device indicator in a circular motion around the inner circular user interface may result in an input data value scrolling at a three month interval. In an example embodiment where a user is entering the days component of a date using the inner circular user interface, the input data value may scroll at a larger granularity, such as a ten-day interval or a fifteen-day interval, in response to circular motion of a user input device indicator within the inner circular user interface.

Outer circular user interface offers the user finer control over the adjusting or scrolling of an input data value. Using the foregoing example embodiment, when a user makes a circular motion within outer circular user interface, the interval or granularity by which the input data value changes is small. In an example embodiment, circular motion in the outer circular user interface may cause the input data value to scroll on a one-day basis, as opposed to a ten- or fifteen-day basis using the inner circular user interface.

At operation 706, the device or one of its components may detect an initial contact point of a user input device indicator within the concentric circular user interfaces. Detection of the initial contact point may determine whether to implement coarse or fine adjustment of an input data value. In an example embodiment, the initial contact point may be determined by interfacing with a device driver of the device. For example, the device may include a touch screen through which a user can submit touch gestures to interact with the device. Each touch gesture may be received and translated into an input command recognizable by an application using the circular user interfaces. The translation of the touch gesture may include a determination of a location that the user contacted the touch screen. The contact location may be compared a location of the generated user interface to determine if the user contacted the touch screen within the user interface, and if so, the location within the user interface.

At operation 708, a rotational velocity of the user input device indicator is measured. The rotational velocity—the speed at which a user moves the input device indicator (e.g., an icon or cursor reflecting a position of the user input device)—may dictate how quickly the data input value changes or scrolls. In an example embodiment, rotational or angular velocity is determined by measuring an angle formed between the origin and a radius formed from the center point of the UI to the contact point, and by determining a rate of change in the angle over time as a user moves the user input device indicator in a circular manner around the circular user interface.

At operation 710, the location of the user input device indicator (e.g., within the inner concentric circular user interface or the outer concentric circular user interface) and the measured rotational velocity are used to determine an input data value that is displayed to the user. As discussed herein, these factors may determine the speed and granularity by which the input data value scrolls or adjusts. The granularity by which the input data value increments or decrements when scrolling may be dependent on the contact point within the circular user interfaces. Contacting the inner concentric circular user interface may result in a large granularity, while contacting the outer concentric circular user interface may result in a small granularity. The concentric circular user interface is designed such that a user may transition between inner and outer concentric circular user interfaces simply by moving from one circle to the other without extraneous movements or clicks. In an example embodiment, the direction of circular motion may dictate a direction of scrolling (e.g., forward scrolling or backward scrolling). For example, circular motion in one direction (e.g., clockwise) may scroll a date in a forward direction, while circular motion in an opposite direction (e.g., counterclockwise) may scroll a date in a backward direction.

At operation 712, the application executing the circular user interfaces determines if a user has finished selecting an input data value for a particular field or sub-field. For example, the application may determine if a user has finished entering the month sub-field of a date field, or the hour sub-field of a time field. The user may be determined to have finished entering the input data value if the user enters a command recognized by the application as an indication that the user is finished entering the input data value. For example, if the user taps the user interface, the application may recognize that the user has finished selecting the input data value. Alternatively, the user may apply pressure to the touch screen to indicate the user is finished entering the input data value. In a further example embodiment, a user may indicate completion of data input value entry by using a horizontal or vertical movement on the touch screen. As the touch screen recognizes circular motion for scrolling or adjusting the input data value, an alternate touch screen gesture, such as a horizontal or vertical gesture, may represent completion of the selection of the input data value.

Upon completion of the selection of a sub-field, the example method may return to operation 708, where the user may be prompted for an input data value for a subsequent sub-field. The example method also may return to operation 708 if the user does not submit a command recognized to be an indication that the input data value selection is complete.

If the user does enter a command indicating selection of the input data value is complete, at operation 714, the selected input data value is displayed to the user in the input field, and the generated circular user interface is removed from display.

Modules, Components and Logic

Certain embodiments are described herein as including logic or a number of components, modules, or mechanisms. A component or a module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component or a module mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components or modules at different times. Software may accordingly configure a processor, for example, to constitute a particular component or module at one instance of time and to constitute a different component or module at a different instance of time.

Components or modules can provide information to, and receive information from, other components or modules. Accordingly, the described components or modules may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or module may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers. In an example embodiment, the machine-readable medium may be a non-transitory machine- or computer-readable storage medium.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network. The computer program may include one or more functions or algorithms that may be implemented in hardware, software, or a combination of software and hardware in one embodiment. The computer program comprises computer executable instructions stored on a tangible computer readable medium, such as memory or other type of data storage devices. Further, described functions may correspond to modules, which may be software, hardware, firmware, or any combination thereof. Multiple functions are performed in one or more modules as desired, and the embodiments described are merely examples. The software is executed, at least in part, on one or more of at least one computer processor, digital signal processor, Application Specific Integrated Circuit (ASIC), microprocessor, or other type of processor operating on a system, such as a personal computer (PC), set top box, personal digital assistant (PDA), smart phone, server, router, or other device capable of processing data, including network interconnection devices.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 8:
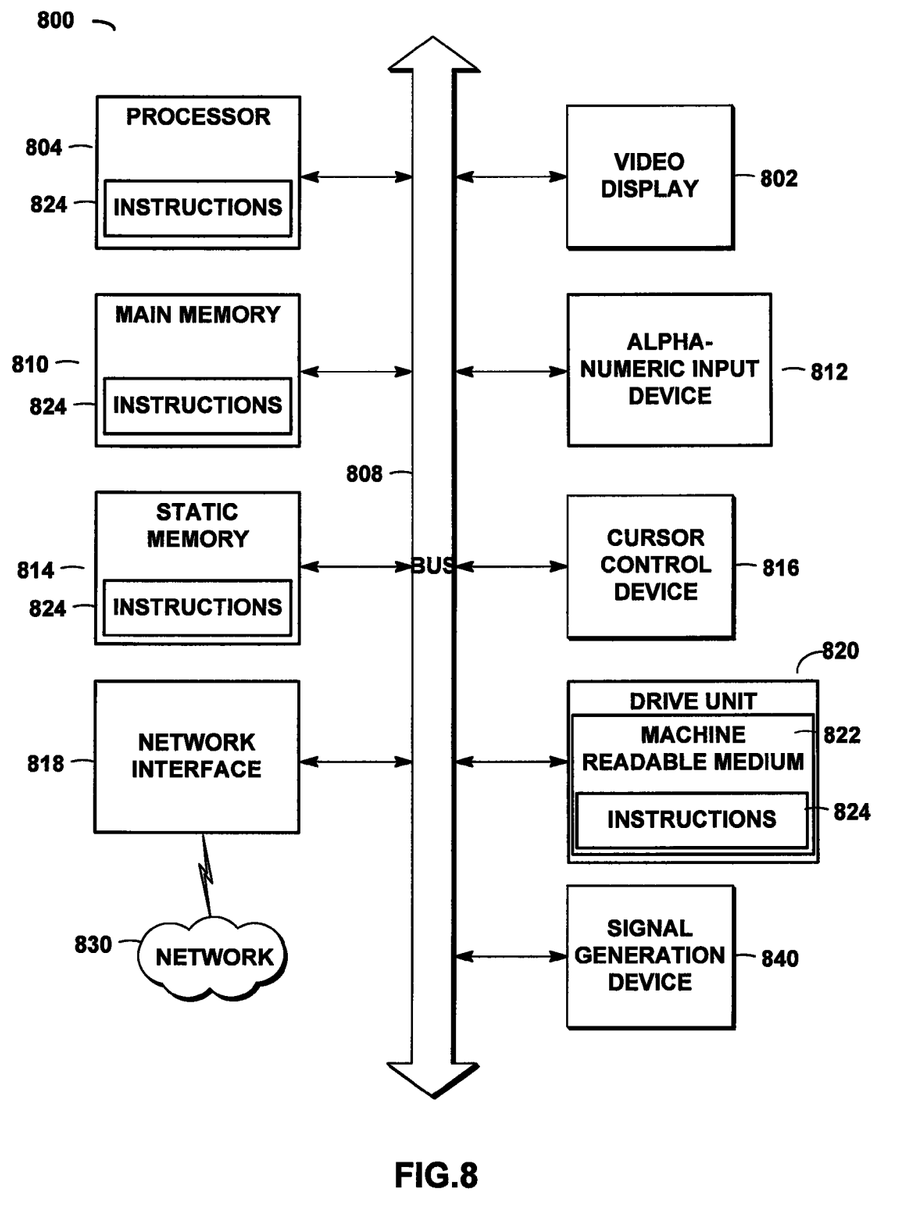
FIG. 8 illustrates a diagrammatic representation of machine in the example form of a computer system within which a set of instructions, for causing the machine to perform any one or more of the methodologies discussed herein, may be executed.

FIG. 8 illustrates a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client device or machine 102, 104, 106 of FIG. 1 in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes at least one processor 804 (e.g., a central processing unit (CPU), a graphics processing unit (GPU) or both), a main memory 8010 and a static memory 814, which communicate with each other via a bus 808. The computer system 800 may further include a video display unit 802 (e.g., a liquid crystal display (LCD) or a cathode ray tube (CRT)). The computer system 800 also includes an alphanumeric input device 812 (e.g., a keyboard), a user interface (UI) navigation device 816 (e.g., a mouse), a disk drive unit 820, a signal generation device 840 (e.g., a speaker) and a network interface device 818.

The disk drive unit 820 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 810 and/or within the processor 804 during execution thereof by the computer system 800, the main memory 810 and the processor 804 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 824 may further be transmitted or received over a communications network 830 using a transmission medium. The software 824 may be transmitted using the network interface device 818 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above-described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above-described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above-described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. §1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system, comprising:
a processor-implemented user interface (UI) generator module configured to generate a touch-enabled UI in response to a selection of an input data field, the touch-enabled UI comprising an inner concentric circle UI and an outer concentric circle UI;
a processor-implemented movement detection module configured to:
detect a user input contact point within at least one of the inner concentric circle UI and the outer concentric circle UI; and
measure an angular velocity of circular movement from the user input contact point around the at least one of the inner concentric circle UI and the outer concentric circle UI; and
a processor-implemented data input module configured to:
adjust an input data value at a granularity based on the user input contact point and at a rate based on the measured angular velocity; and
provide the adjusted input data value for display.

2. The system of claim 1, further comprising a processor-implemented input device interface module configured to receive touch gestures from a touch-enabled input device and to translate the received touch gestures into commands recognized by the processor-implemented movement detection module.

3. The system of claim 1, wherein the input data field is at least one of a time field and a date field.

4. The system, of claim 1, wherein the processor-implemented movement detection module is further configured to detect a touch command indicating completion of selection of the input data value.

5. The system of claim 4, wherein the touch command is at least one of a tap on a touch-enabled display screen, a horizontal movement, and a vertical movement.

6. The system of claim 1, wherein the processor-implemented UI generator module is further configured to enlarge the touch-enabled UI in response to a touch command to zoom in on the touch-enabled UI.

7. The system of claim 1, wherein the inner concentric circle UI adjusts the input data value at a first granularity and the outer concentric circle UI adjusts the input data value at a second granularity.

8. A computer-implemented method, comprising:
detecting selection of an input data field by a first touch gesture submitted via a touch enabled input device;
generating a circular user interface (UI) in response to the selection of the input data field, the circular UI comprising an inner concentric circle UI and an outer concentric circle UI;
detecting a user input contact point within at least one of the inner concentric circle UI and the outer concentric circle UI, the user input contact point corresponding to a location of the first touch gesture submitted via the touch-enabled input device;
measuring an angular velocity of circular motion from the user input contact point around the at least one of the inner concentric circle UI and the outer concentric circle UI; and
adjusting a displayed input data value at a granularity based on the user input contact point and at a rate based on the angular velocity.

9. The computer-implemented method of claim 8, further comprising detecting a second touch gesture submitted via the touch-enabled input device, the second touch gesture indicating completion of selection of the displayed input data value.

10. The computer-implemented method of claim 8, further comprising enlarging the circular UI in response to receiving a second touch gesture.

11. The computer-implemented method of claim 8, wherein the input data field is at least one of a date field and a time field.

12. The computer-implemented method of claim 8, wherein the inner concentric circle adjusts the displayed input data value at a first granularity and the outer concentric circle adjusts the displayed input data value at a second granularity.

13. The computer-implemented method of claim 9, wherein the second touch gesture is at least one of a tap gesture on the touch-enabled input device, a pressure gesture applied to the touch-enabled input device, a horizontal movement, and a vertical movement.

14. A non-transitory machine-readable storage medium storing a set of instructions that, when executed by a processor, causes the processor to perform operations, comprising:
detecting selection of an input data field by a first touch gesture submitted via a touch-enabled input device;
generating a user interface (UI) in response to the selection of the input data field, the UI comprising an inner concentric circle UI and an outer concentric circle UI;
detecting a user input contact point within at least one of the inner concentric circle UI and the outer concentric circle UI, the user input contact point corresponding to a location of the first touch gesture submitted via the touch-enabled input device;
measuring an angular velocity of circular motion from the user input contact point around the at least one of the inner concentric circle UI and the outer concentric circle UI; and
adjusting a displayed input data value at a granularity based on the user input contact point and at a rate based on the angular velocity.

15. The non-transitory machine-readable storage medium of claim 14, further comprising detecting a second touch gesture submitted via the touch-enabled input device, the second touch gesture indicating completion of selection of the displayed input data value.

16. The non-transitory machine-readable storage medium of claim 14, further comprising enlarging the generated UI in response to receiving a second touch gesture.

17. The non-transitory machine-readable storage medium of claim 14, wherein the input data field is at least one of a date field and a lithe field.

18. The non-transitory machine-readable storage medium of claim 14, wherein the inner concentric circle UI adjusts the displayed input data value at a first granularity and the outer concentric circle UI adjusts the displayed input data value at a second granularity.

19. The non-transitory machine-readable storage medium of claim 15, wherein the second touch gesture is at least one of a tap gesture on the touch-enabled input device, a pressure gesture applied to the touch-enabled input device, a horizontal movement, and a vertical movement.

\* \* \* \* \*